(12) United States Patent
Elberson

(10) Patent No.: US 6,705,173 B1
(45) Date of Patent: Mar. 16, 2004

(54) AIR FLOW RATE METER

(75) Inventor: Michael D. Elberson, Elm Grove, WI (US)

(73) Assignee: Autoquip, Inc., Menomonee Falls, WI (US)

( * ) Notice: Subject to any disclaimer, the term of this patent is extended or adjusted under 35 U.S.C. 154(b) by 0 days.

(21) Appl. No.: 09/946,241

(22) Filed: Sep. 5, 2001

(51) Int. Cl.[7] .................................................. G01F 1/34
(52) U.S. Cl. ..................................................... 73/861.42
(58) Field of Search .......................... 73/388, 732, 714, 73/40, 45.4, 756, 861.42; 137/340, 597; 184/106, 1.5

(56) References Cited

U.S. PATENT DOCUMENTS

| | | |
|---|---|---|
| 3,241,365 A | 3/1966 | Schroeder et al. |
| 3,703,616 A * | 11/1972 | Martin ...................... 200/56 R |
| 4,270,568 A * | 6/1981 | Gray ............................ 137/460 |
| 4,340,050 A | 7/1982 | Noiles |
| 4,375,813 A | 3/1983 | Hessel |
| 4,590,790 A | 5/1986 | Hicks et al. |
| 4,916,949 A | 4/1990 | Lofink |
| 5,036,884 A * | 8/1991 | Miller et al. ................. 137/270 |
| 5,398,721 A * | 3/1995 | Pryor ...................... 137/505.25 |
| 5,594,167 A | 1/1997 | Ward |
| 5,755,254 A * | 5/1998 | Carter et al. ................. 137/340 |
| 6,244,384 B1 * | 6/2001 | Few .............................. 141/98 |
| 6,308,556 B1 * | 10/2001 | Sagi et al. ....................... 73/40 |

* cited by examiner

Primary Examiner—Edward Lefkowitz
Assistant Examiner—Jewel V. Thompson
(74) Attorney, Agent, or Firm—Boyle Fredrickson Newholm Stein & Gratz S.C.

(57) ABSTRACT

An air flow rate meter and method for monitoring the flow of air in high-pressure compressed air system includes a low pressure gauge contained within a sealed, high pressure vessel that is connected to the high pressure compressed air line. The low pressure gauge is pneumatically connected to opposite ends of a tube disposed within the meter through which the main air pressure line flows in order to detect the pressure drop across the restricted orifice defined by the tube. The measured pressure drop is then used by the gauge to determined the rate of air flowing through the line. To avoid damage to the meter, the air flow rate meter further includes a pressure regulating valve for regulating the input air flow pressure during startup of the system, and a check valve for closing the flow path through the pressure vessel during shut down.

25 Claims, 6 Drawing Sheets

AIR FLOW RATE METER

BACKGROUND OF THE INVENTION

1. Field of the Invention

This application relates to an air flow gauge, more particularly to an air flow gauge intended for use in conjunction with a paint spraying gun atomization circuit.

2. Description of Related Art

Many factories use compressed air as a source of power for operating various types of production equipment. "Compressed air," which is sometimes referred to as "pressurized air" or referred in spray paint operations as "atomization air," is defined as free air that has been compressed into a volume that is smaller than the volume the air normally occupies at normal atmospheric pressure. Controlled expansion of the compressed air can be used as a source of power to operate a wide range of pneumatically powered tools. Compressed air is typically supplied from onsite or nearby compressors and piped through a distribution system to a downstream point of use. Paint spraying operations for painting various types of manufactured products, such as automobiles, is one typical use of compressed air.

In a spray paint operation, a paint fluid, which can be in the form of either a liquid or a fine powder, is mixed together with compressed air in a spray gun nozzle in order to atomize the paint into extremely fine particles and to transfer the paint particles onto the surface of the item being painted. One commonly used spray paint gun, referred to in the industry as a high volume low pressure (HVLP) spray gun, generates high volumes of low pressure air that propel the paint particles from the nozzle of the gun toward the surface of the article being painted. Other uses of compressed air include pneumatically powered drills, wrenches and other types of machine tools. The optimum operation of such tools depends upon providing a specified flow rate of compressed air to the tool.

Industrial compressed air systems are commonly controlled by pressure regulation, meaning by regulating the nominal air pressure at a certain point in the system. A pressure regulator might be placed, for example, at or near the compressor, at one or more points on the distribution line, or on a hose used to supply air to the tool. The major disadvantage with this method is that measuring air pressure at only one particular point within the system is not necessarily a good indicator of the volume of air flowing though that particular point in the system. Air pressure drops as it flows through the system, and the amount that the air pressure drops from one point to the next varies greatly depending on the specific system installation and also on varying conditions of usage occurring during the course of the day. For example, in many cases a compressed air system supplies not only spray guns but also other devices used in a paint shop such as sanders, polishers, screw drivers, drills and so forth.

For paint spray operations in particular, one commonly used method for determining whether a sufficient amount of compressed air is being delivered to the spray gun is to place a pressure gage on the cap of the spray gun immediately after the painter has set the spray gun for proper atomization of the paint, but before he actually begins painting. Many operators, however, find this extra step to be a great inconvenience as it interrupts their painting operations. Therefore, this procedure is often disregarded. Another method of checking whether a sufficient amount of compressed air is being delivered to the spray gun is to attach an air gauge to the handle of the gun. However, attaching a pressure gauge to the gun naturally increases its weight. Over a period of time, muscle fatigue sets in, thereby causing the operator to use unnatural arm and wrist actions which, in turn, cause over spray or under spray conditions and other flaws in the paint job.

More importantly, regulating the nominal pressure at any one point in the system does not necessarily mean that the proper amount of air, or even any air is flowing at another point downstream. For example, there may be blockage in the spray nozzle of a paint gun, or a break in the line or some other problem in the system.

Another problem with the traditional method of using a single pressure gauge to monitor air flow in a high pressure line is that the particular gauge being used must be able to withstand the high pressure of the spray system. In paint spray systems, the liquid paint is atomized under high pressure, typically in the range of about 10 p.s.i. for a HVLD spray gun, 25 to 60 p.s.i. for a dynamic air spray and 100–125 p.s.i. for a static air spray. Thus, pressure gauges used on such systems are therefore typically made from very heavy and bulky components and consequently lack the resolution necessary to accurately measure the difference between, for example, 8 and 9 p.s.i. Traditional monitors also lack repeatability as mass and hysteresis of the moving components of the gauge effect the movement of gauge needle. Thus, accurately regulating the pressure and flow rate of air in a spray system is extremely difficult.

It is advantageous to monitor airflow through a spray gun to assure proper performance. Restrictions in the air delivery hose, gun body, and spray gun cap can greatly affect the airflow through them. Varying conditions of hose length, delivery pressure, and supply air temperature also affect pressure and flow rates. For monitoring the air flow it is desirable to use an inline circuit monitor which can be connected to the components to be monitored rather than to disassemble a spray gun system and take the component to a test bench to test the flow rate. An inline flow gauge is especially important when the spray gun is part of an automated machine and is not designed to be removed easily from the control system.

Various types of gauges such as floating ball, turbine, thermal, ultra-sonic, and differential pressure gauges have been used to measure the flow rate of air in high pressure air systems. Such devices are commonly calibrated so that their scales read in terms of cubic feet or liters per minute. They must be carefully made so as to be accurate, yet at the same time, they must be able to withstand the high pressures and also sudden pressure changes or surges that commonly occur in industrial paint spray air systems. As a result, these flow meters typically constitute the most expensive single element in an inline monitor.

Virtually all known monitoring devices for high pressure systems have a number of drawbacks. As mentioned, heavy gauges can withstand sudden pressure changes, yet they cannot accurately measure small pressure differences. Additionally, the narrow resolution of heavy gauges makes them less effective when the equipment is working at low pressures. Light gauges can accurately measure small pressure differences, but they cannot withstand the high pressures and sudden pressure changes in typical paint spray lines. Finally, known differential pressure measuring devices such as floating ball gauges and other devices mentioned above are too expensive to use on a plant-wide basis for many users.

Accordingly, there is a need for an improved air flow rate monitoring device or gauge that can accurately measure the air flow of sprays within high-pressure paint spray systems which can also be manufactured at a considerably lower cost than other flow gauges using differential measuring methods.

SUMMARY OF THE INVENTION

An improved flow rate meter than can accurately measure and regulate flow of sprays in high-pressure paint spray systems is disclosed. The invention, which is defined by the claims set out at the end of this disclosure, is especially designed and adapted to address several of the drawbacks noted above with respect to the use of conventional, heavy-duty high pressure gauges. Specifically, the air flow rate meter disclosed herein provides an accurate measurement of air flow rates operating at high pressure values and can also withstand sudden pressure drops and surges.

The air flow rate meter disclosed herein comprises a means for providing a low pressure flow meter which can be used in conjunction with gas lines of much higher pressure than the meter or gauge is rated for. The means comprises a meter or gauge mounted within a sealed housing that is connected to the gas line. By mounting the low pressure gauge within the housing, and having the pressure within the gauge and housing equalized with the air pressure in the line, the gauge can be used to detect any pressure drops or surges within the gas line. The gauge is connected to a restricted orifice to measure the pressure drops or surges in the gas line, which directly correspond to the rate (i.e., volume) of air flowing through the line.

More specifically, the air flow rate meter of the present invention comprises a low-pressure meter, (e.g., 0 to 5 p.s.i.), encapsulated within a high-pressure vessel, with both the low pressure meter and the high pressure vessel pneumatically connected to the high pressure air line. Although the system pressure may be extremely high (e.g., 100 to 125 p.s.i. or more), the gauge of the present invention is designed to measure a relatively small pressure drop through a known restriction at a specific point in the gauge. Due to the relationship between a pressure drop between opposed ends of a restriction having known dimensions and the flow rate through the restriction, the flow rate can be measured by calculating the pressure drop across the known restriction.

The durability of the proposed invention is dependent upon equalizing the pressure within the pressure vessel with the outside system pressure. Once the entire system is up and running and fully pressurized, the air pressure in the low pressure gauge and the pressure vessel naturally becomes equalized to the system pressure. However, during startup and shut down, the difference in pressure between the airline and the vessel may exceed the capacity of low-pressure meter and, unless the meter is effectively isolated, damage the internal parts of the meter. Therefore, the vessel further comprises a pressure regulator for regulating the input pressure during startup, and a check value for equalizing the pressure across the gauge during inlet pressurization.

Accordingly, the air flow rate meter of the present invention provides a highly accurate measurement of the air flow rate to the paint spray gun or other air tool connected to the system, yet at the same time is able to withstand the high pressures and sudden pressure changes, i.e., drops or surges, that commonly occur in industrial paint spray air systems. Other objects and advantages of the invention will become apparent from the following description which, taken in connection with accompanying drawings, set forth by illustration and example certain embodiments of the present invention.

BRIEF DESCRIPTION OF THE DRAWINGS

The drawings, wherein a certain presently preferred embodiment of the invention are illustrated, include the following.

DETAILED DESCRIPTION OF THE PREFERRED EMBODIMENTS

Figure 1:
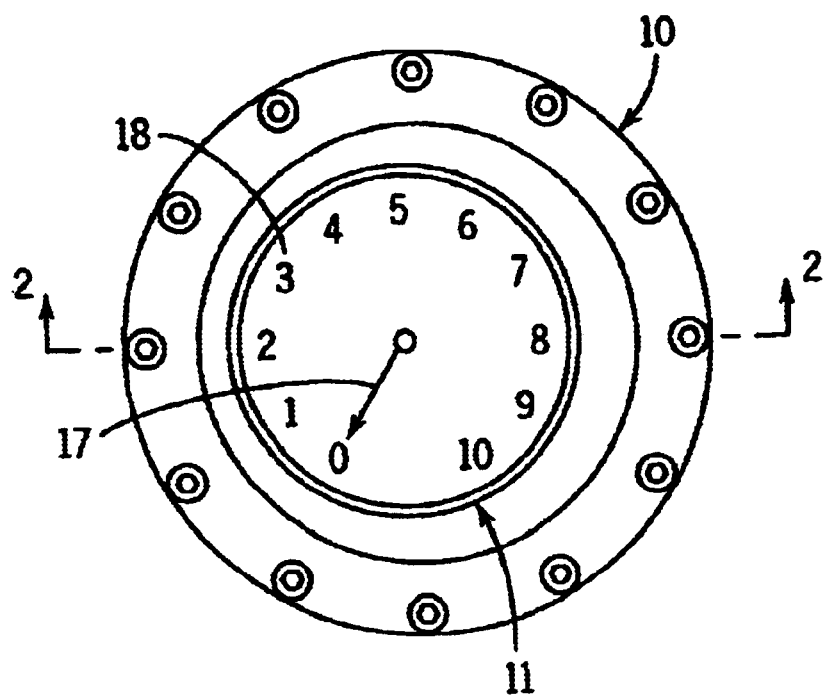
FIG. 1 is a top plan view of an air flow rate meter of the present invention.

Before explaining the preferred embodiments invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

In the drawings, a first preferred embodiment of the air flow rate meter in accordance with the invention is illustrated in FIG. 1 at the reference numeral 10. The air flow rate meter 10 includes a flow gauge 11, which determines flow based on the pressure differential between the upstream side 12a and downstream side 12b of a tube 13. The flow gauge 11 is, relative to the overall system pressure, a low-pressure gauge. For a typical paint spray system that operates on a system pressure on the order of 100 to 120 p.s.i., the flow gauge 11 is preferably capable of measuring pressure differentials on the order of about 0 to 3 p.s.i. The low pressure gauge is preferably a conventional diaphragm gauge that includes a diaphragm (not shown), which is an elastic pressure sensing element formed from a thin wall of an elastic or flexible material. A rotating rod and arm (not shown) rest on the thin walled diaphragm. The rotating rod is connected to a geared movement (not shown) through a linkage system (not shown). The rotating rod and geared movement are in turn coupled to a shaft (not shown) which actuates the needle 17 when the diaphragm senses a pressure differential in the air flow, indicating the air flow on a scale 18 marked in appropriate pressure units, preferably in cubic feet per minute. Any conventional diaphragm flow gauge having the required properties is acceptable for use in the air flow rate meter 10 of the present invention.

As is explained in detail below, one side of the diaphragm is subjected to upstream pressure and other side is subject to the downstream pressure of the tube 13. The change in pressure on opposite sides of the tube 13 is related to flow rate of the air through the tube 13. Thus, the pressure differential sensed by the diaphragm is used to calculate the flow rate based on conversions known in the art.

Figure 2:
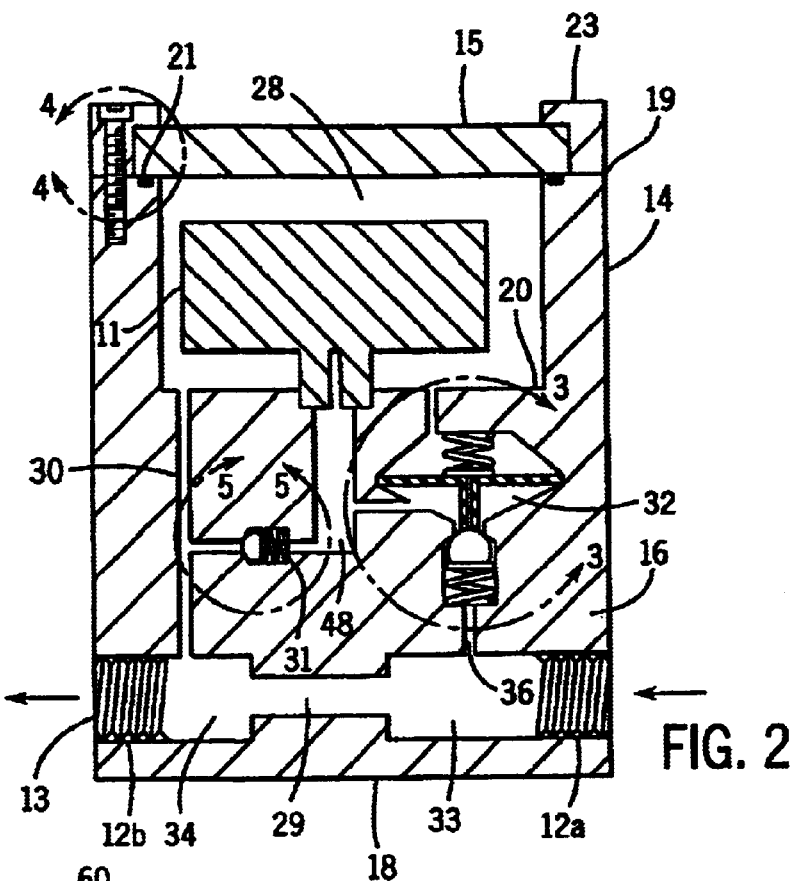
FIG. 2 is a cross-sectional view along line 2—2 of FIG. 1.
Figure 4:
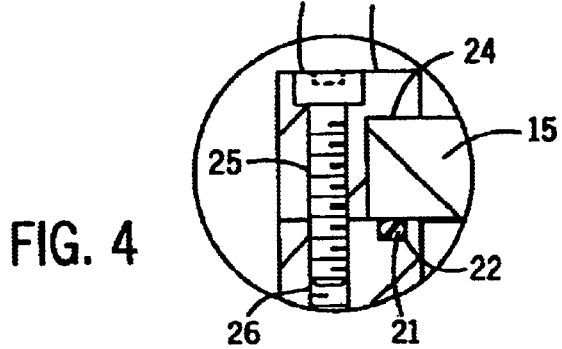
FIG. 4 is a circular sectional view along line 4—4 of FIG. 2.

Referring now to FIGS. 2 and 4, the low pressure gauge 11 is contained within a windowed pressure vessel or chamber 14 comprised of a transparent cover 15, preferably formed of Plexiglas, secured to a main body 16. The body 16 of the vessel 14 includes a base 18 and an open end 19 opposite the base 18. The open end 19 defines a recess 20 that extends into the body 16 of the pressure vessel 14 towards the base 18. The recess 20 receives and retains the low pressure gauge 11 such that the gauge 11 rests within the vessel 14 at a level below the open end 19. To enclose the gauge 11 within the pressure vessel 14 and make the vessel 14 air tight, an elastic O-ring 21 is disposed within a circumferential groove 22 extending around the open end 19. The O-ring 21 contacts the cover 15 when the cover 15 is positioned over the open end 19 and provides an air tight seal between the body 16 and the cover 15.

To retain the cover 15 in position over the recess 20 in sealing engagement with the O-ring 21, a cap 23 is secured to the open end 19 over the cover 15. The cap 23 has an outer dimension approximately equal to that of the body 16 and includes a notch 24 that receives the edge of the cover 15 when the cap 23 is positioned over the cover 15 and open end 19 of the body 16. The cap 23 also has a number of bores 25 disposed along the periphery of the cap 23 and spaced from the notch 24. The bores 25 extend completely through the cap 23 and are alignable with a number of apertures 26 disposed along the periphery of the open end 19. When the bores 25 are aligned with the apertures 26, a plurality of bolts 27 can be engaged within the bores 25 and apertures 26 to secure the cap 23 and cover 15 to the body 16. The engagement of the cap 23 and the cover 15 over the open end 19 encloses the recess 20 forming an enclosed chamber 28 within the body 16.

Opposite the cap 23, the body 16 also includes the tube 13. The tube 13 is disposed within the body 16 adjacent the base 18, with the upstream side 12a and downstream side 12b positioned on opposite sides of the body 16. The upstream side 12a and downstream side 12b are each separately connected to the chamber 28 in a manner to be described later. Between the upstream side 12a and downstream side 12b, the tube 13 includes a restricted diameter portion or throat orifice 29. The throat orifice 29 has a diameter less than that of each side 12a and 12b of the tube 13 and generates a pressure drop in the flow of air between the respective sides of the tube 13 by increasing the speed of the air flow. This pressure drop can be measured by the gauge 11 and used to determine the air flow rate through the system.

The inline flow meter 10 is capable of being used in spraying systems in which the air flows through the system at high flow rates, e.g., flows on the order of twenty-five (25) to fifty (50) cubic feet per minute through the orifice 29. Also, using a low pressure gauge 11 having a construction, as specified previously in the chamber 28 permits the measurement of fine variations of the pressure drop across the tube 13. To measure the pressure drop across the tube 13, the gauge 11 is connected on one side of the diaphragm to the upstream end 12a and to the downstream end 12b on the opposite side of the diaphragm. In the chamber 28, air is maintained under a pressure equal to the pressure in the downstream end 12b leading to the spray gun (not shown) or other tool that is attached to the system. This downstream end pressure in the chamber 28 contacts the diaphragm within the gauge 11 in order to provide one half of the pressure differential across the diaphragm. The upstream end 12a is connected to the opposite side of the diaphragm to complete the pressure differential and enable the measurement to be made. To protect the low pressure gauge 11 from extreme changes in pressure within the system, a downstream safety valve 31 and an upstream safety valve 32 are housed within the body 16 and are operably connected between the chamber 28 and the downstream end 12b, and between the gauge 11 and the upstream end 12a, respectively, as described in detail below.

Air under pressure from an atomization air supply, e.g. an air compressor, (not shown) that is coupled to the system enters the flow meter 10 through the upstream end 12a of tube 13. An inlet passageway 33 having a narrowing cross-section leads from the upstream end 12a to a throat orifice 29. Opposite the inlet passage 33 the diameter of the orifice 29 expands to form an outlet passageway 34 that leads to the downstream end 12b. The inlet passageway 33 is coupled to an adaptor (not shown), such as by a threaded connection, that is further connected opposite the inlet passageway 33 to the source of compressed air. Similarly, the outlet passageway 34 is coupled to an adaptor (not shown) that is connected opposite the outlet passageway 34 to a hose (not shown) leading to the point of usage, namely, a spray gun (not shown) or other pneumatically operated tool.

Immediately upstream of the restricted orifice 29 of the tube 13 is disposed an upstream tap 36 leading into the body 18 towards the gauge 11. The upstream tap 36 enables a portion of the pressurized air flow at the upstream end 12a to be directed into the gauge 11. When air flowing through the tube 13 reaches the restricted orifice 29, the flow rate increases due to the constriction of space in the orifice 29 of the tube 13. Concurrently, a drop in pressure occurs as the air flows through the throat 29 of the tube 13. The air pressure of the flow through the tube 13 is also sampled downstream of the orifice 29 at a downstream tap 30 in order to enable the gauge 11 to determine flow rate in the manner explained below.

Air from the inlet passage 33 on the upstream side of the orifice 29 is routed to the flow gauge 11 via the upstream tap 36, which is formed of a first segment 40 that extends upwardly from and perpendicular to the inlet passageway 33 and a second segment 42 which extends inwardly towards the center of the gauge 11 parallel to the inlet passageway 33. The first segment 40 and second segment 42 of the upstream tap 36 have a smaller diameter than the inlet passageway 33 and are operably connected to one another by a valve well 44 that encloses the upstream safety valve 32, whose construction is described in detail below. The safety valve 32 limits the pressure differential applied to the diaphragm within the low pressure gauge 11 through the upstream tap 36 when the pressure differential exceeds the maximum capacity of the gauge 11, i.e., above 3 p.s.i. When the pressure differential is beneath the maximum capacity of the gauge 11, air is permitted to travel from the first segment 40 through the valve 32 and into the second segment 42, which is connected to the low pressure gauge 11 by a gauge inlet passageway 48 that is in fluid communication with one side of the diaphragm inside the gauge 11 opposite the chamber 28.

Air entering the outlet passage 34 or the downstream side of the orifice 29 is routed to the chamber 28 and into contact with the flow gauge 11 via the downstream tap 30. The downstream tap 30 is formed of a conduit 38 that extends upwardly from and perpendicular to outlet passageway 34.

The downstream tap 30 also has a smaller diameter that of outlet passageway 34 and is connected to the downstream safety valve 31 (described in detail below) that operates to protect the gauge 11 from reverse pressure flows, e.g., when the source of compressed air is switched off and the pressure within the inlet passage 33 is exhausted while the pressure within the outlet passage 34 remains constant. Opposite the downstream tap 30, the downstream safety valve 31 is also connected to the gauge inlet passageway 48.

Figure 3:
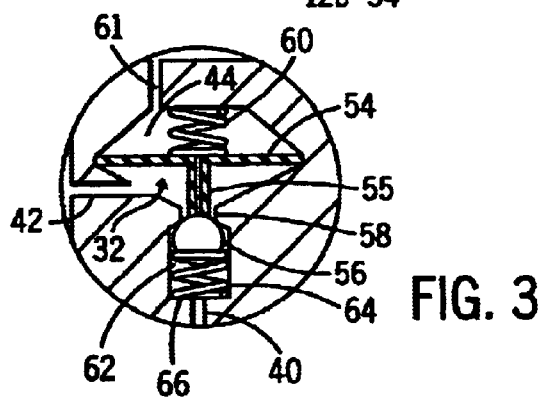
FIG. 3 is a circular sectional view along line 3—3 of FIG. 2.

As best shown in FIG. 3, the upstream safety valve 32 disposed within the valve well 44 contains a flow controlling diaphragm 54 extending across the well 44, a hollow stem 55 extending downwardly from one side of the diaphragm 54, a flow controlling ball 56 which is releasably engageable with the stem 55 and a flow controlling ball seat 58 formed in the first segment 40, and a pressure spring 60 engaged with the diaphragm 54 opposite the stem 55, which urges the flow control ball 56 out of engagement with the ball seat 58. The diaphragm 54 is in fluid communication with the upstream side 12a on one side via the first segment 40 of the tap 36 and the chamber 28 on the opposite side by an opening 61. Thus, the diaphragm 54 can operate to either close or open the valve 32 as necessary based upon the pressure differential between the upstream side 12a and the chamber 28 as applied to each side of the diaphragm 54.

The safety valve 32 also includes a backpressure poppet valve 62 that includes a backpressure poppet spring 64 which rests on a backpressure poppet seat 66. The poppet spring 64 urges the flow controlling diaphragm 54 and ball 56 upwardly against the bias of the pressure spring 60 into engagement with the seat 58. Thus, the pressure spring 60 and poppet spring 64 are directly opposed to one another and operate in concert with the pressure differential applied to the diaphragm 54 to open or close the upstream valve 32.

Figure 6:
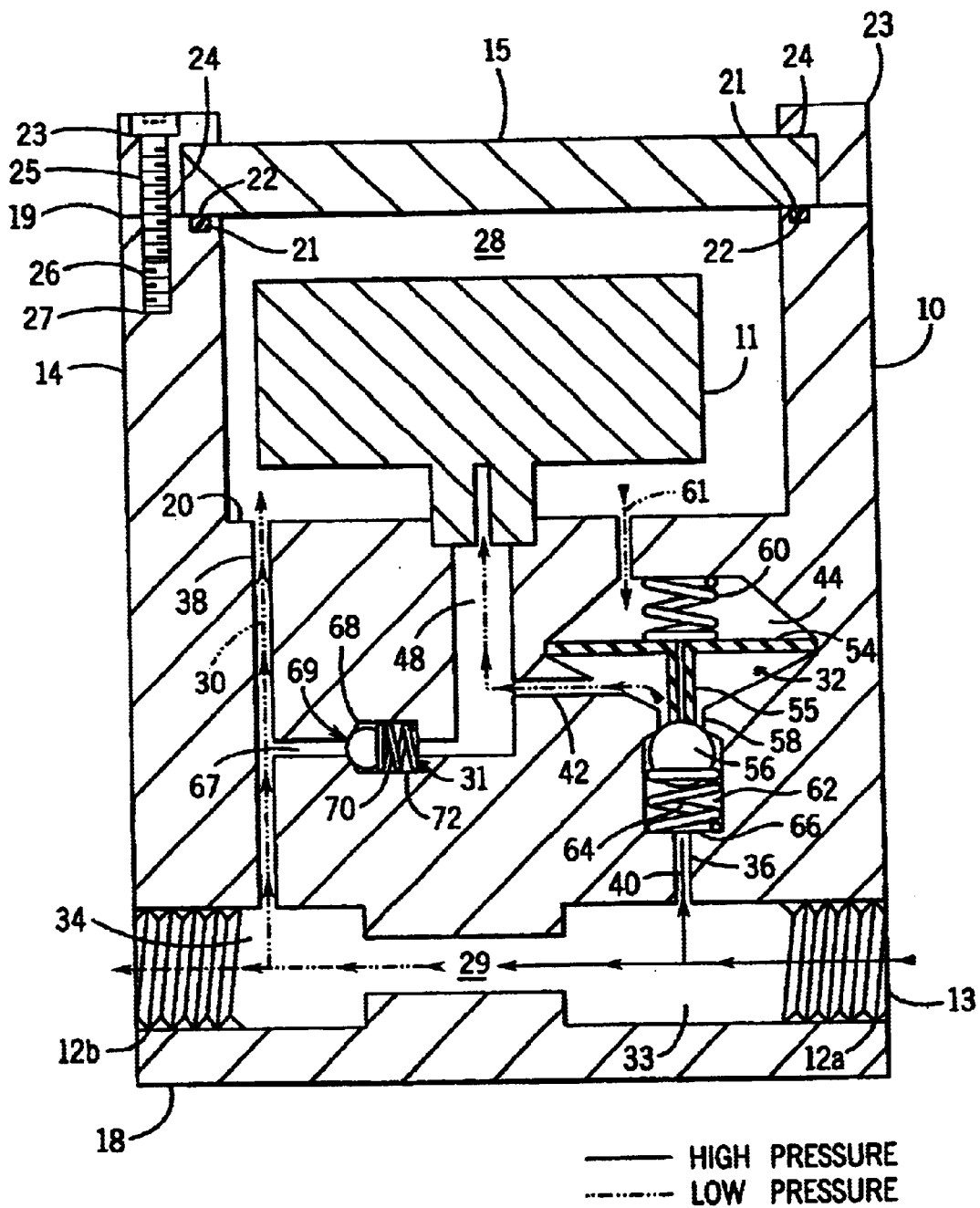
FIG. 6 is a cross-sectional view similar to FIG. 2 illustrating the operation of the air flow rate meter in a normal flow mode.

The purpose of the valve well 44 and safety valve 32 is to limit the pressure differential applied to the diaphragm in the gauge 11 when the flow rate through the tube 13 exceeds the maximum displayed on the flow gauge 11, i.e., the maximum capacity of the pressure gauge 11, which in this application has been specified to be the rate equal to a pressure drop of 3 p.s.i. across the tube 13. As air flows through the inlet passage 33, the flow control diaphragm 54 limits the air flow past the flow-controlling ball 56 and flow-controlling ball seat 58 by modulating the flow rate through the upstream tap 36 based on the pressure differential across the flow control diaphragm 54. For example, as shown in FIG. 6, in a normal air flow condition a portion of the incoming air flow through the upstream side is diverted upwardly into the upstream tap 36. A portion of the air flow flowing through the downstream side 12b is also diverted upwardly through the downstream tap 30 into the chamber 28. The air flow within the chamber 28 then flows downwardly through the opening 61 to contact one side of the diaphragm 54 opposite the upstream tap 36. The air flow contacting the diaphragm 54 opposite the upstream tap 36 opposes the pressure exerted on the diaphragm 54 by the flow of air through the upstream tap 36 and past the ball 56. After flowing past the ball 56, the air flow through the upstream tab 36 is at a pressure even further reduced from that found at the downstream end 12b, such that the air flow through the opening 61 pushes downwardly on the diaphragm 54 in concert with the spring 60, allowing the ball 56 to be unseated from the seat 58 against the bias of the poppet spring 64 and the pressure of the incoming air, and allowing the air flow from the upstream end 12a to flow through the valve well 44 to the gauge 11 as shown in FIG. 6.

Figure 7:
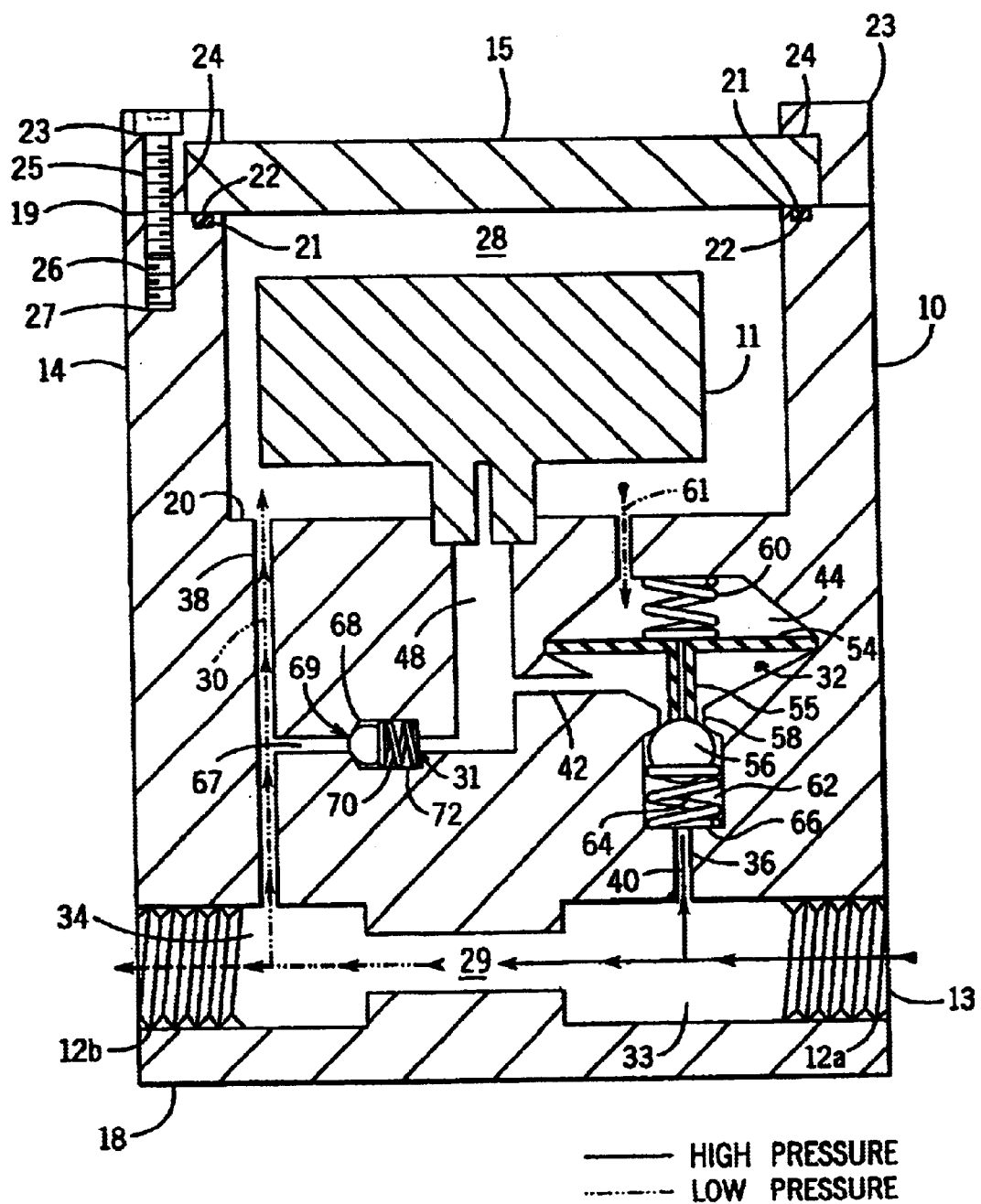
FIG. 7 is a cross-sectional view similar to FIG. 2 illustrating the operation of the air flow rate meter in an over maximum pressure flow mode.
Figure 8:
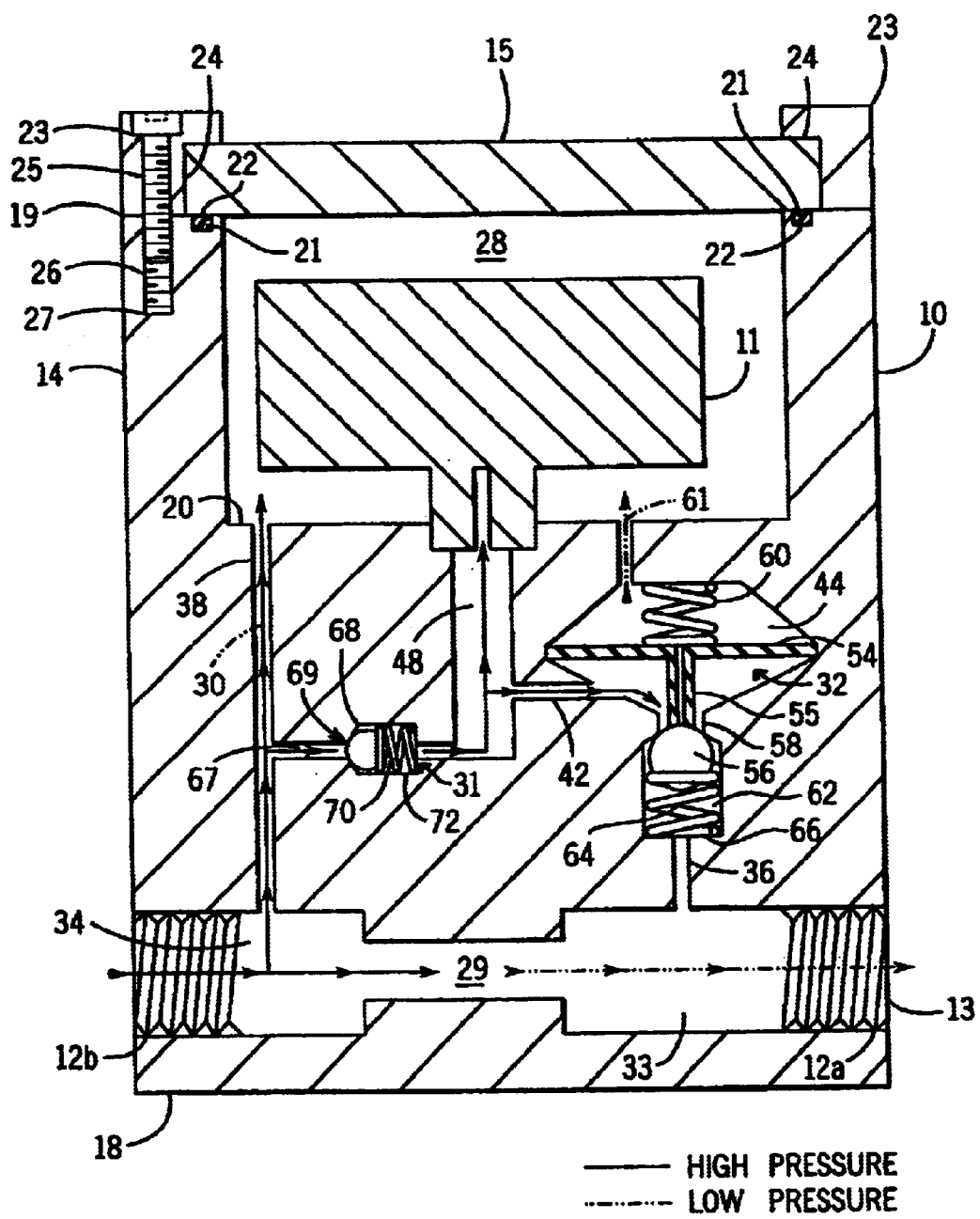
FIG. 8 is a cross-sectional view similar to FIG. 2 illustrating the operation of the air flow rate meter in a reverse flow mode.

The tension of the pressure spring 60 and the poppet spring 64 are balanced to limit the air flow past the seat 58 when the pressure drop across the flow-control diaphragm 54 exceeds the maximum for the gauge 11. As a result, the safety valve 32 limits the pressure differential that is allowed to exist across the windowed pressure vessel 14 which equals the tension of the flow control spring 60. For example, in the situation where the incoming air flow through the upstream end 12a is at a pressure higher than the pressure maximum for the gauge 11, the upstream safety valve 32 will operate to close off the flow of air through the upstream tap 36 in order to prevent damage from being done to the gauge 11. As best shown in FIG. 7, when the incoming air at the upstream end 12a creates a pressure differential higher than the maximum rated pressure differential for the gauge 11, the force of this air urges the ball 56 upwardly into engagement with the ball seat 58 in conjunction with the poppet spring 64 against the downward force on the diaphragm 54 provided by the pressure spring 60 and air pressure generated by the air flow at the downstream end 12b. Thus, none of the high pressure air is allowed to flow through the upstream tap 36 to the gauge 11, thereby preventing the gauge 11 from being damaged.

Figure 5:
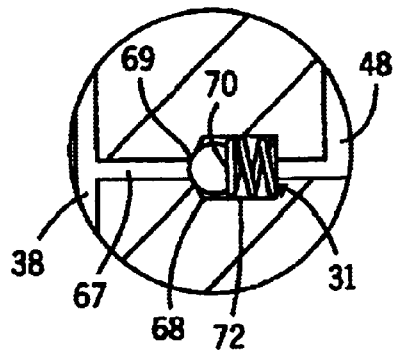
FIG. 5 is a circular sectional view along line 5—5 of FIG. 2.

Referring now to FIGS. 2 and 5, as noted above, air from the outlet passage 34 is routed to the flow gauge 11 via the downstream tap 30 and the conduit 38. The downstream tap 30 also includes an offshoot 67 connected between the conduit 38 and the gauge inlet passageway 48, allowing the downstream tap 30 to communicate with the gauge inlet 48. The offshoot 67 includes an enlarged diameter section that forms a second valve well 68 and seat 69 that encloses the downstream safety valve 31, which protects the low pressure gauge 11 from reverse pressure flows through the meter 10. The downstream valve 31 includes a ball 70 releasably engageable with the seat 69 and a check spring 72 disposed in engagement with the ball 70 opposite the seat 69 that urges the ball 70 into engagement with the seat 69. The spring 72 is configured to retain the ball 70 in engagement with the seat 69 within the range of pressure differentials measurable by the gauge 11.

Looking now at FIG. 6, in a reverse air flow mode where the pressure of the air at the outlet passage 34 and flowing upwardly along the conduit 38 and offshoot 67 is much larger than the pressure of the air at the inlet passage 33 and flowing into the gauge inlet passageway 48, i.e., is greater than the maximum for the gauge 11, the ball 70 within the downstream valve 31 is urged away from the seat 69 by the pressure of the air in the conduit 38 and offshoot 67 because the air pressure exceeds the bias force of the spring 72. This enables the high pressure air flow from the downstream tap 30 to enter both the chamber 28 and the gauge inlet passageway 48 and contact both sides of the diaphragm within the gauge 11. This ensures that the pressure differential across the diaphragm within the gauge 11 will not exceed the limit for the gauge 11 because the pressure acting on each side of the diaphragm is coming from the same source and should be at the same pressure. Further, the high pressure air flows from the gauge inlet passageway 48 through the second segment 42 and into the first valve wall 44. In the wall 44, the air contacts the diaphragm 54 and ball 56 to urge the diaphragm 54 and ball 56 away from one another. Once the stem 55 of the diaphragm 54 separates from the ball 56, the high pressure air can flow upwardly through the hollow stem 55 and into the chamber 28 to relieve any pressure building that may occur in the gauge inlet passageway 48.

In operation, after connecting the gauge 11 to the compressed air system, compressed air flows into the tube 13 through the inlet passageway 33. The air flow is sampled at the upstream tap 36. The sampled air travels through the upstream tap 36 and through the upstream safety valve 32 to contact one side of the diaphragm contained within the low pressure gauge 11. The unsampled air flow travels through the throat orifice 29 of the tube 13, which increases the velocity of the air flow while also reducing its pressure. The air flow is then sampled again at the downstream tap 30 located on the downstream side of the throat orifice 29. Air moves through the downstream tap 30 into the chamber 28 and contacts the low pressure side of the diaphragm within the low pressure gauge 11. In response to the pressure differential between the upstream and downstream air flow samples, the diaphragm moves within the gauge 11. This movement is then transferred to the rotating rod and arm that are connected to the diaphragm. The rotating rod, connected to a geared movement through a linkage system, moves the shaft and in turn, drives the needle 17 over the scale 18 to generate an air flow rate reading.

The flow gauge 11 described herein has a rugged construction and can be incorporated in a spray finishing system to measure flows produced over a wide range of pressures. The flow gauge 11 is of simpler construction than flow gauges heretofore used and, therefore, can be manufactured and assembled at considerably lower cost than such conventional gauges. This factor will consequently decrease considerably the overall cost of an air flow monitor. The flow gauge 11 described herein is particularly useful monitoring finishing components, which operate in pressure ranges without large pressure drops across the tube 13.

Figure 9:
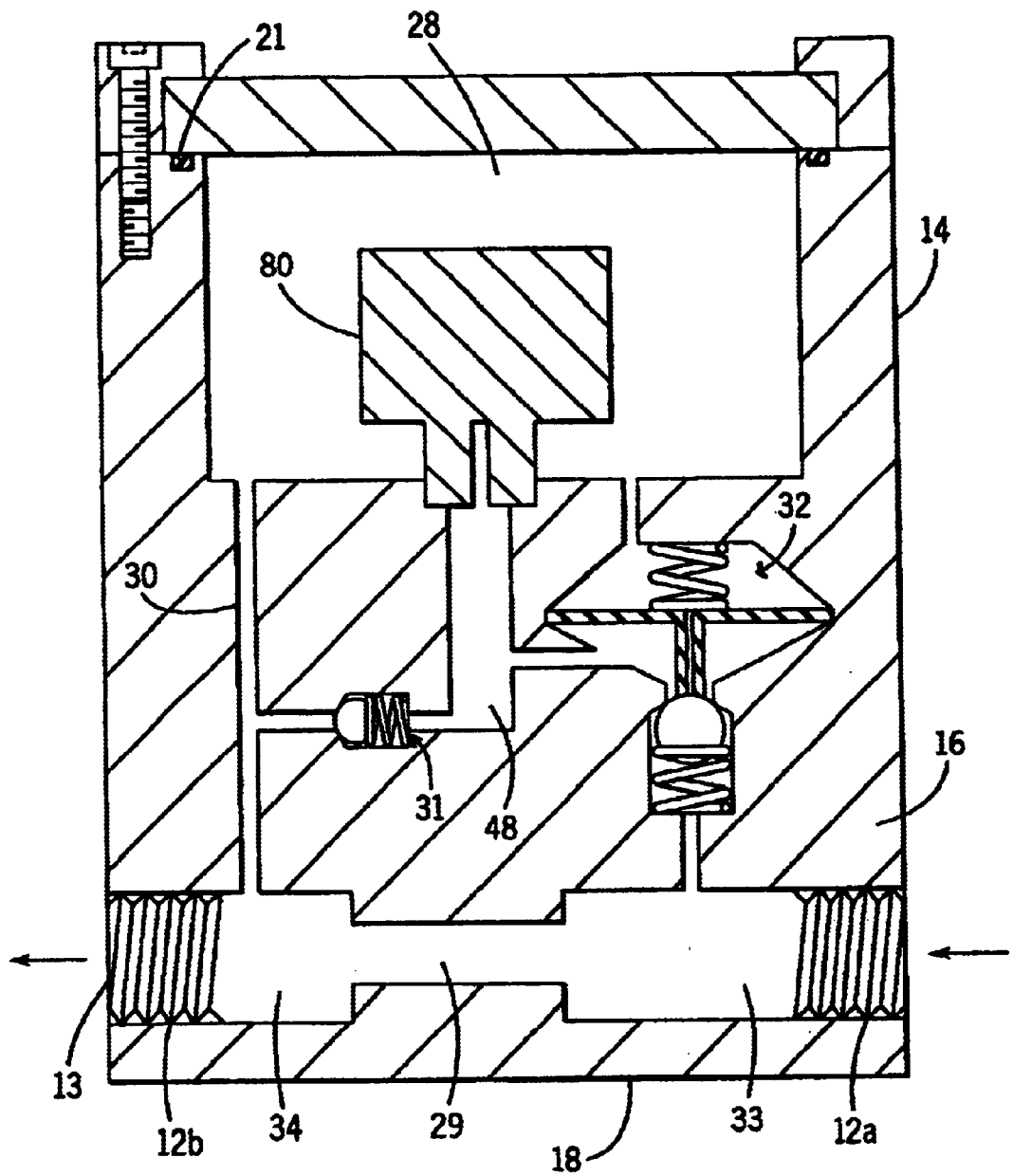
FIG. 9 is a cross-sectional view similar to FIG. 2 illustrating a second embodiment of the present invention.

Referring now to FIG. 9, if it is necessary to provide a digital readout or value for the pressure differential measured by the flow rate meter 10, the gauge 11 can also take the form of a digital pressure transducer 80. The transducer 80 is positioned in the same location as the gauge 11 in order to be in contact with the different air flows on opposite sides of the meter 10. The transducer 80 provides a digital output signal that can be displayed on the transducer 80 or transmitted to a separate monitor (not shown) that can be connected to an automated air flow controller capable of automatically altering the air flow through the system in response to the signal from the transducer 80.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

The invention is not intended to be limited to the preferred embodiments described above but rather is intended to be limited only by the claims set out below. Thus, the invention encompasses all alternate embodiments that fall literally or equivalently within the scope of these claims.

What is claimed is:

1. An air flow meter for a compressed air system that operates at relatively high pressures, the flow gauge comprising:
    a) a tube including a throat, an upstream side on one side of the throat and a downstream side spaced from the upstream side;
    b) a low pressure gauge configured to indicate an air flow rate through the tube by measuring a pressure differential between the upstream side and the downstream side;
    c) a housing defining a pressurized chamber which encloses the low pressure gauge;
    d) a first valve connected between the low pressure gauge, the chamber and the upstream side and configured to prevent damage to the low pressure gauge from an air flow pressure differential greater than a maximum pressure differential measureable by the low pressure gauge.

2. The invention according to claim 1 wherein the first valve includes:
    a) a first valve well;
    b) a diaphragm extending across the valve well;
    c) a seat on the valve well spaced from one side of the diaphragm;
    d) a first ball connected to the diaphragm adjacent and selectively engagable with the seat; and
    e) a first spring engaged with the diaphragm opposite the ball and biased to urge the ball out of engagement with the seat.

3. The invention according to claim 2 further comprising a second spring engaged with the first ball opposite the diaphragm and biased to urge the first ball into engagement with the first seat.

4. The invention according to claim 2 wherein the first ball is in fluid communication with the low pressure gauge and the upstream side of the tube.

5. The invention according to claim 2 wherein the first spring is in fluid communication with the housing.

6. The invention according to claim 5 wherein the first spring has a bias equal to the pressure differential limit for the low pressure gauge.

7. The invention according to claim 1 further comprising a second valve disposed in a channel extending between the conduit and the low pressure gauge and configured to prevent damage to the low pressure gauge from a reversed air flow through the tube.

8. The invention according to claim 7 wherein the second valve includes:
    a) a second seat;
    b) a second ball selectively engageable with the second seat; and
    c) a third spring engaged with the second ball opposite the second seat and biased to engage the second ball with the second seat.

9. The invention according to claim 1 wherein the downstream side is disposed on the throat.

10. The invention according to claim 1 wherein the downstream side is spaced from the throat opposite the upstream side.

11. The invention according to claim 1 wherein the tube, the pressurized chamber, and the conduit are each integrally formed within the housing.

12. The invention according to claim 1 further comprising a conduit extending directly between the chamber and the downstream side to pressurize the chamber.

13. An air flow meter for a compressed air system that operates at high pressures, the meter comprising:
    a) a housing;
    b) a first passageway located in the housing and including a restricted diameter portion that divides the first passageway into an upstream side and a downstream side;
    c) a low pressure gauge enclosed within a pressurized chamber defined by the housing and spaced from the first passageway;
    d) a second passageway having a small flow capacity relative to the first passageway and extending directly between the downstream side and the chamber to pressurize the chamber;

e) a third passageway spaced from the second passageway, having a small flow capacity relative to the first passageway and connecting the upstream side to the chamber and to the gauge; and f) a pressure relief valve disposed within the third passageway, the pressure relief valve in fluid communication with the chamber on one side and with the gauge and the first passageway on the opposite side, the pressure relief valve configured to close at a specified pressure differential between opposite sides of the relief valve.

14. The invention according to claim 13 further comprising:

a) a fourth passageway having a diameter approximately equal to the second passageway, the fourth passageway connecting the second passageway with the third passageway and the gauge; and b) a check valve disposed in the fourth passageway and configured to open at a specified pressure differential between the second passageway and the third passageway.

15. The invention according to claim 14 further comprising a gauge inlet passage connecting the third passageway and fourth passageway with the gauge.

16. The invention according to claim 13 wherein the housing includes a cover releasably secured over the chamber.

17. The invention according to claim 13 wherein the cover is transparent.

18. The invention according to claim 13 wherein the gauge is capable of measuring pressure differentials of between 0–5 p.s.i.

19. The invention according to claim 13 wherein the first passageway, the pressurized chamber, the second passageway and the third passageway are each integrally formed within the housing.

20. A method for determining the flow rate of air through a compressed air system operating at relatively high pressures, the method comprising the steps of:

a) providing an air flow rate meter including a housing having a first passageway extending through the housing, the first passageway including a restricted diameter portion that divides the first passageway into an upstream side and a downstream side, a low pressure gauge enclosed within a pressurized chamber defined by the housing, a second passageway extending between the downstream side and the chamber to pressurize the chamber, a third passageway connecting the upstream side with the gauge and with the chamber, and a pressure relief valve disposed within the third passageway, the pressure relief valve having a first side in fluid communication with the chamber, a second side in fluid communication with the upstream side and the gauge, and configured to close off communication between the third passageway and the gauge when a predetermined pressure differential between the chamber and the gauge is reached;

b) attaching a compressed air inlet to the upstream side of the first passageway;

c) attaching a compressed air outlet to the downstream side of the first passageway; and d) supplying a flow of compressed air to the first passageway through the compressed air inlet.

21. The method of claim 20 wherein the step of supplying the flow of compressed air to the flow meter comprises activating a tool connected to the compressed air outlet opposite the downstream side of the first passageway.

22. The method of claim 20 wherein the air flow meter includes a check valve located in a fourth passageway connected between the second passageway and the gauge, the check valve configured to allow fluid communication through the fourth passageway between the second passageway and the gauge when a predetermined pressure differential between the second passageway and the gauge is reached.

23. The method of claim 22 further comprising the step of cutting off the flow of compressed air to the first passageway.

24. The method of claim 23 further comprising the step of opening the check valve to prevent damaging the gauge after cutting off the flow of compressed air.

25. The method of claim 20 further comprising the step of operating the pressure relief valve to prevent damaging the gauge after supplying the flow of compressed air.

* * * * *